Patented Oct. 15, 1935

2,017,269

UNITED STATES PATENT OFFICE 2,017,269

COMPOSITION FOR TREATING DISEASED TREES

Alvis Yates, Lenoir, N. C.

No Drawing. Application March 20, 1935, Serial No. 12,105

3 Claims. (Cl. 47—1)

My invention relates to a composition for treating diseased trees, particularly fruit trees such as pear trees, apple trees, et cetera.

In many sections of the country groves and orchards of trees, particularly fruit trees, have been afflicted for many years with "fire blight" or "wilt". The trees have been found to be infected with Bacillus amylovorus and as a result the trees are short-lived and bear little, if any, fruit. The disease spreads from infected trees so that the condition is wide spread. Attempts have been made to control the disease by use of a spray without success.

The object of the invention is to provide an improved treating composition whereby the blight is eradicated and the trees restored to a healthy condition.

In accordance with the invention the trees are treated preferably in the late winter or early spring before the sap begins to rise, although satisfactory results are obtained if the treatment is carried out later. In North Carolina the treatment may be made as late as March 1–15th and further south it is preferably done earlier, and may be done later in northern states.

The process is as follows: In trees having a trunk diameter of about four inches or more a small hole is bored in the trunk of the tree at or just above the ground line, the hole sloping slightly downward and terminating slightly short of the pith or center of the trunk of the tree. In the case of smaller trees the hole is shorter and for nursery stock or very small trees a small abrasion or cut through the bark of the tree is sufficient. In the cut or abrasion in small trees about ten or twelve drops of treating fluid are injected. In the case of larger trees a proportionately larger amount is used, for example twenty drops for tree having a diameter of four inches. A part of the fluid is permitted to overflow and moisten the bark around the opening or cut.

For trees larger than four inches diameter at the ground line, two or more injections are preferably made in openings equally spaced around the trunk of the tree, the openings extending approximately half the distance to the center of the trunk. The openings may be plugged with a short section of a green twig, a tight seal or closure being unnecessary.

The composition used for treatment of "fire blight" or "wilt" preferably consists of about two drams or one-fourth of an ounce of oil of pine tar, generally called rectified oil of pinetar, and four ounces of spirits of turpentine, or oil of turpentine. A small proportion of an inert material, such as liquid coloring matter, may be added if desired and the proportions of turpentine and oil of pine tar may be varied somewhat. Good results have been obtained with the proportions varied between 20:1 and 12:1.

The treatment may be used for various diseases but it has been found especially effective in the case of "fire blight" or "wilt". Other trees besides fruit trees may, of course, be treated in the manner described and for the best results the process should be repeated every spring for two or three years. All of the trees in an orchard or grove should be treated or trees not treated will re-infect healthy trees.

Remarkable results have been obtained in the treatment of pear, apple, quince and other fruit trees, as in no case has blight appeared in the summer following a treatment as described above. While I do not wish to be limited to the following theory of the process involved it appears that the germ of "fire blight" and of other diseases which respond to this treatment hibernates in the cortex, xylem and pith of the tree where it is killed by the treating fluid so that it is not carried by the sap to the branches and leafy extremities of the tree.

I claim:

1. A composition for tree injection of the character described comprising substantially sixteen parts of turpentine and one part of oil of pinetar.

2. A composition for tree injection of the character described consisting of spirits of turpentine and oil of pinetar.

3. A composition for tree injection of the character described consisting of spirits of turpentine, oil of pinetar and an inert coloring substance.

ALVIS YATES.